Figure 1:
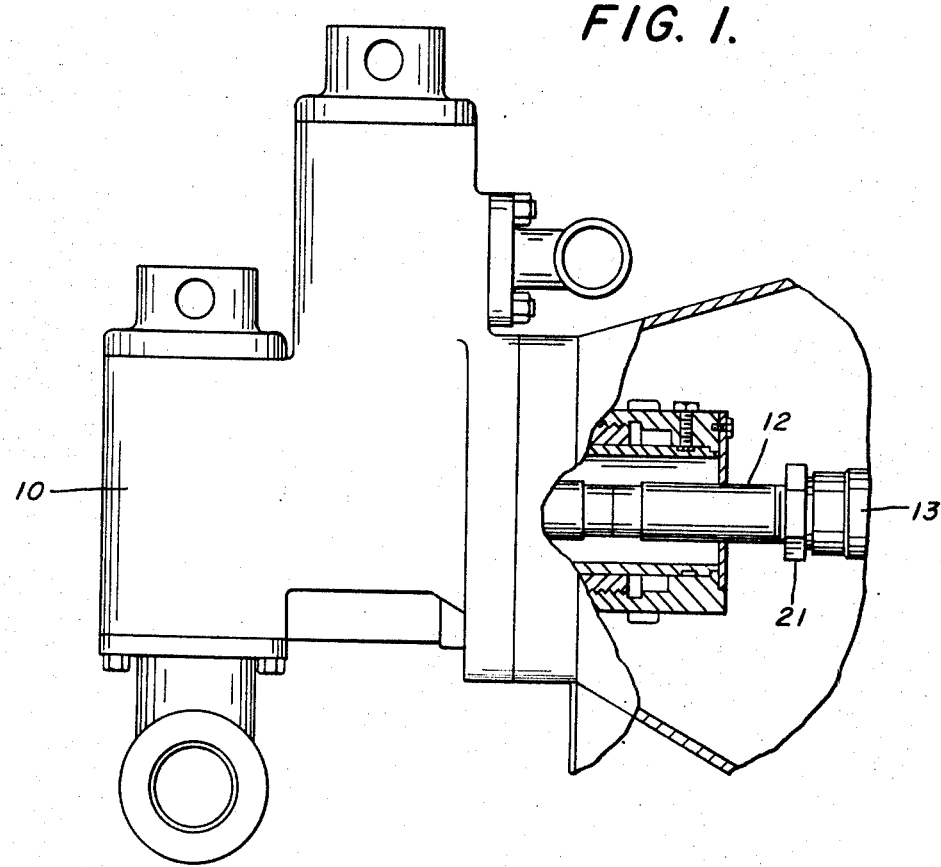

United States Patent

Rizzone

[15] 3,704,904
[45] Dec. 5, 1972

[54] PISTON ROD JOINT
[72] Inventor: Michael L. Rizzone, Dallas, Tex.
[73] Assignee: United States Steel Corporation
[22] Filed: Jan. 24, 1972
[21] Appl. No.: 220,122

[52] U.S. Cl..................................................287/125
[51] Int. Cl................................................F16d 1/00
[58] Field of Search ......287/125, 117, 128; 285/333, 285/334; 85/1 T; 279/99, 100

[56] References Cited

UNITED STATES PATENTS

| 1,378,290 | 5/1921 | Smith | 279/100 |
| 1,879,856 | 9/1932 | Peterson | 287/125 |
| 2,045,520 | 6/1936 | Davison | 287/125 |
| 2,510,377 | 6/1950 | Carr | 92/165 |

Primary Examiner—Andrew V. Kundrat
Attorney—Walter P. Wood

[57] ABSTRACT

A joint for connecting a crosshead extension rod to a piston rod end-to-end. The piston rod has an integral tapered threaded pin at its end, a straight threaded portion inwardly of the pin, and an undercut section between the pin and the straight threads. The extension rod has a tapered threaded bore receiving the pin. A lock nut is engaged with the straight threads and tightened against the end face of the extension rod to maintain the undercut section under tension throughout the working cycle.

3 Claims, 2 Drawing Figures

PATENTED DEC 5 1972 3,704,904

PISTON ROD JOINT

This invention relates to an improved joint particularly for connecting a crosshead extension rod to the piston rod of a pump.

A conventional slurry pump or mud pump has a piston rod to which is joined an extension rod leading a crosshead. At this joint the piston rod is threaded into a bore in the end of the extension rod. The joint tends to fail through fatigue at the thread root of the piston rod which lies in the plane of the end face of the extension rod.

An object of the present invention is to provide an improved joint which forestalls failure of a piston rod at the foregoing location.

A further object is to provide a piston rod joint in which the piston rod has an undercut section prestressed under tension where it enters the bore in the extension rod, thereby forestalling failure at this location.

Figure 2:
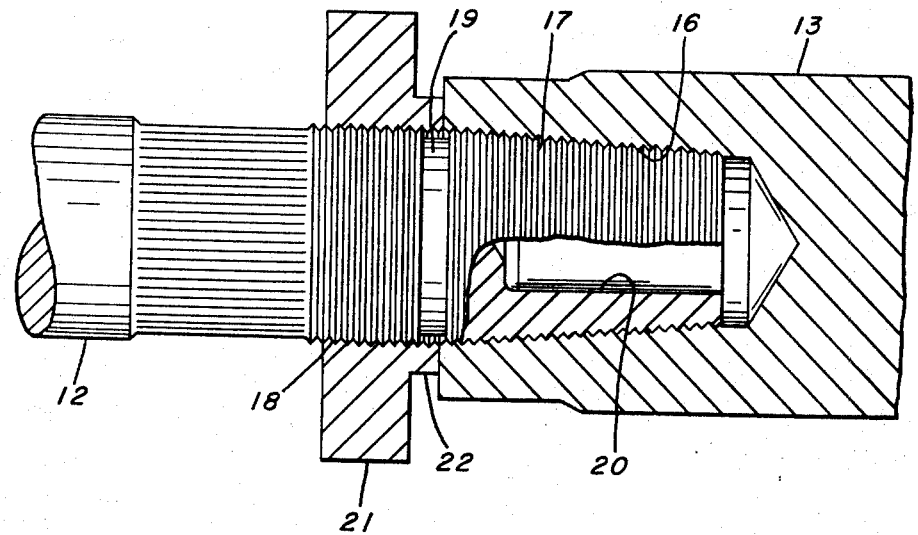

In the drawing:

FIG. 1 is a side elevational view, with parts broken away, of a pump in which the joint of the present invention is embodied; and FIG. 2 is a vertical sectional view on a larger scale of the joint.

FIG. 1 shows a reciprocating pump 10 which has a piston rod 12, and an extension rod 13 joined end-to-end with the piston rod. The joint between the piston rod and the extension rod is constructed in accordance with my invention, but otherwise the pump may be of conventional construction and hence is not shown in detail. The extension rod leads to a crosshead (not shown) which is connected to a suitable drive.

As best shown in FIG. 2, the end face of the extension rod 13 has a tapered threaded bore 16. The piston rod 12 has an integral tapered threaded pin 17 at its end, a straight threaded portion 18 inwardly of the pin, and an undercut section or groove portion 19 between the pin and the straight threads. Preferably the end face of the piston rod has a socket 20. The tapered pin is threadedly engaged with the threads of bore 16. A lock nut 21 is threadedly engaged with the straight threaded portion 18 of the piston rod 12 and has a flange 22 which abuts the annular end face of the extension rod 13. Flange 22 clears the undercut section 19.

The tapered threaded connection of pin 17 affords maximum tightness, while the socket 20 makes the pin limber and distributes the thread load along the length of the pin element-to-element. In the absence of the socket, the extension rod 13 at the joint is under compression and the pin 17 under tension. I tighten nut 21 sufficiently to prestress the undercut section 19 under a tensile load greater than the working load of the pump. Consequently the undercut section remains under tension throughout the pumping cycle.

The critical portion of a conventional joint, where failure is most likely to occur, is in a thread root of the piston rod opposite the end face of the extension rod. My invention eliminates any thread root at this location, and provides instead an undercut stress-relieved section which always remains under tension. Consequently there is no alternating tensile and compressive loading such as leads to fatigue failure.

I claim:

1. The combination, with a piston rod and an extension rod connected to said piston rod end-to-end, of an improved joint comprising an integral tapered threaded pin at the end of said piston rod, a straight threaded portion on said piston rod inwardly of said pin, an undercut groove portion on said piston rod extending between the pin and the straight threads, said extension rod having a tapered threaded bore in its end face receiving said pin, and a lock nut threadedly engaging said straight threaded portion and abutting the end face of said extension rod, the end face of said extension rod being opposite said groove portion, said lock nut clearing said groove portion and being tightened sufficiently to maintain said groove portion under tension within the working load on the joint.

2. A combination as defined in claim 1 in which said pin has a socket in its end face.

3. A combination as defined in claim 1 in which said piston rod is embodied in a reciprocating pump.

* * * * *